(12) United States Patent
Nakanishi et al.

(10) Patent No.: US 6,702,352 B2
(45) Date of Patent: Mar. 9, 2004

(54) CONSOLE FOR VEHICLE

(75) Inventors: Yutaka Nakanishi, Gunma (JP); Hidetaka Yoneyama, Gunma (JP)

(73) Assignee: Moriroku Kabushiki Kaisha, Gunma (JP)

( * ) Notice: Subject to any disclaimer, the term of this patent is extended or adjusted under 35 U.S.C. 154(b) by 0 days.

(21) Appl. No.: 10/322,630

(22) Filed: Dec. 19, 2002

(65) Prior Publication Data

US 2003/0137158 A1 Jul. 24, 2003

(30) Foreign Application Priority Data

Dec. 25, 2001 (JP) .................................... 2001-392145

(51) Int. Cl.[7] ................................................ B60R 7/04
(52) U.S. Cl. ..................................... 296/24.1; 296/37.8
(58) Field of Search ............................... 296/24.1, 37.8; 248/311.2

(56) References Cited

U.S. PATENT DOCUMENTS 5,921,519 A * 7/1999 Dexter et al. ............ 248/311.2
6,039,296 A * 3/2000 Nishina et al. .......... 248/311.2
6,059,243 A * 5/2000 Hikage et al. ........... 248/311.2

FOREIGN PATENT DOCUMENTS

| JP | 4-24828 | 2/1992 | |
| JP | 405050876 | * 3/1993 | ................ 296/37.8 |

* cited by examiner

*Primary Examiner*—Dennis H. Pedder
(74) *Attorney, Agent, or Firm*—Arent Fox Kintner Plotkin & Kahn PLLC

(57) ABSTRACT

A console for a vehicle includes a sliding-type lid which is mounted on a console body having a tray and which opens and closes an opening in an upper surface of the tray. A goods-supporting member is mounted on the lid and is capable of being selectively moved between an operative position in which it protrudes toward the opening in the tray to prevent the falling-down of goods put in an upright attitude in the tray, and a standby position in which it is housed in the lid, when the lid is in its opened position. Thus, it is possible to prevent the falling-down of the goods put in the upright attitude in the tray without bringing about decrease in internal volume of the tray and increase in size of the console body.

7 Claims, 10 Drawing Sheets

CONSOLE FOR VEHICLE

BACKGROUND OF THE INVENTION

1. Field of the Invention

The present invention relates to an improvement in a console for a vehicle, including a lid which is mounted on a console body having a tray and which slidably moves between a closing position in which an opening in an upper surface of the tray is closed, and an opening position in which the opening is opened.

2. Description of the Related Art

A conventional console for a vehicle has been widely employed in an automobile. In this conventional console, a goods-supporting member is specially mounted to the tray or the console body for retaining goods such as a cup and a can to prevent the falling-down of the goods, when the goods are put in an upright attitude in the tray (see, for example, Japanese Utility Model Application Laid-open No. 4-24828).

To specially mount the goods-supporting member in addition to the lid to the tray or the console body, a space for exclusively mounting the goods-supporting member must be conventionally provided in the tray or the console body, resulting in disadvantages such as a decrease in internal volume and an increase in size of the console body.

SUMMARY OF THE INVENTION

Accordingly, it is an object of the present invention to provide a console for a vehicle, wherein the falling-down of goods put in an upright attitude in the tray can be prevented without bringing about a decrease in internal volume and an increase in size of the console body.

To achieve the above object, according to a first feature of the present invention, there is provided a console for a vehicle, comprising a lid which is mounted on a console body having a tray and which slidably moves between a closing position in which an opening in an upper surface of the tray is closed, and an opening position in which the opening is opened, wherein the lid is provided with a goods-supporting member which is capable of being selectively moved between an operative position in which it protrudes toward the opening in the tray to prevent the falling-down of goods put in an upright attitude in the tray, and a standby position in which it is housed in the lid, when the lid is in its opened position.

With the first feature, the falling-down of the goods upright in the tray can be prevented by moving the goods-supporting member to the operative position in the opened state of the lid, and the inside of the tray can be used widely as a usual goods receptacle and the tray can be closed by the lid without being obstructed by the goods-supporting member by returning the goods-supporting member to the standby position. Moreover, the lid is utilized for mounting the goods-supporting member, and hence it is unnecessary to prepare a space for mounting the goods-supporting member, whereby a decrease in internal volume of the tray and an increase in size of the console body can be avoided.

According to a second feature of the present invention, in addition to the first feature, the lid has a housing chamber in which the goods-supporting member in the standby position is housed, and an access port through which the goods-supporting member is moved from and into the housing chamber into and from the tray, and the goods-supporting member is disposed so that when the goods-supporting member occupies the standby position, it closes the access port.

According to a third feature of the present invention, in addition to the second feature, the goods-supporting member is provided with first and second arms disposed in an L-shape, and is pivotally supported on the lid so that it can be turned between the standby position in which the access port is closed by the first arm and the second arm is housed in a deeper portion of the housing chamber, and the operative position in which the first arm protrudes toward the opening in the tray and the access port is closed by the second arm.

According to a fourth feature of the present invention, in addition to the first or second feature, an operating spring for biasing the goods-supporting member toward the operative position is connected to the goods-supporting member, and a locking means capable of locking and releasing the goods-supporting member in the standby position is mounted between the goods-supporting member and the lid.

According to a fifth feature of the present invention, in addition to the third feature, an operating spring for biasing the goods-supporting member toward the operative position is connected to the goods-supporting member, and a locking means capable of locking and releasing the second arm in the standby position of the goods-supporting member is mounted between the second arm and the lid.

According to a sixth feature of the present invention, in addition to the fifth feature, the goods-supporting member is designed so that when a tip end of the first arm abuts against an inner wall of the tray in a course of closing of the lid when the goods-supporting member is in the operative position, the goods-supporting member is turned toward the standby position by the resulting reaction force.

According to a seventh feature of the present invention, in addition to the first feature, the goods-supporting member is formed into a rod-shape and slidably supported on the lid so that it can be moved between the standby position in which it is housed in the lid, and the operative position in which it protrudes toward the opening in the tray; an operating spring for biasing the goods-supporting member toward the operative position is connected to the goods-supporting member; and a locking means capable of locking and releasing the goods-supporting member in the standby position is mounted between the goods-supporting member and the lid.

The above and other objects, features and advantages of the invention will become apparent from the following description of the preferred embodiments taken in conjunction with the accompanying drawings.

DESCRIPTION OF THE PREFERRED EMBODIMENTS

The present invention will now be described by way of embodiments with reference to the accompanying drawings.

A first embodiment of the present invention shown in FIGS. 1 to 4 will first be described. The terms "front and rear" and "left and right" are referred to, with respect to an automobile provided with a console according to the present invention.

Figure 1:
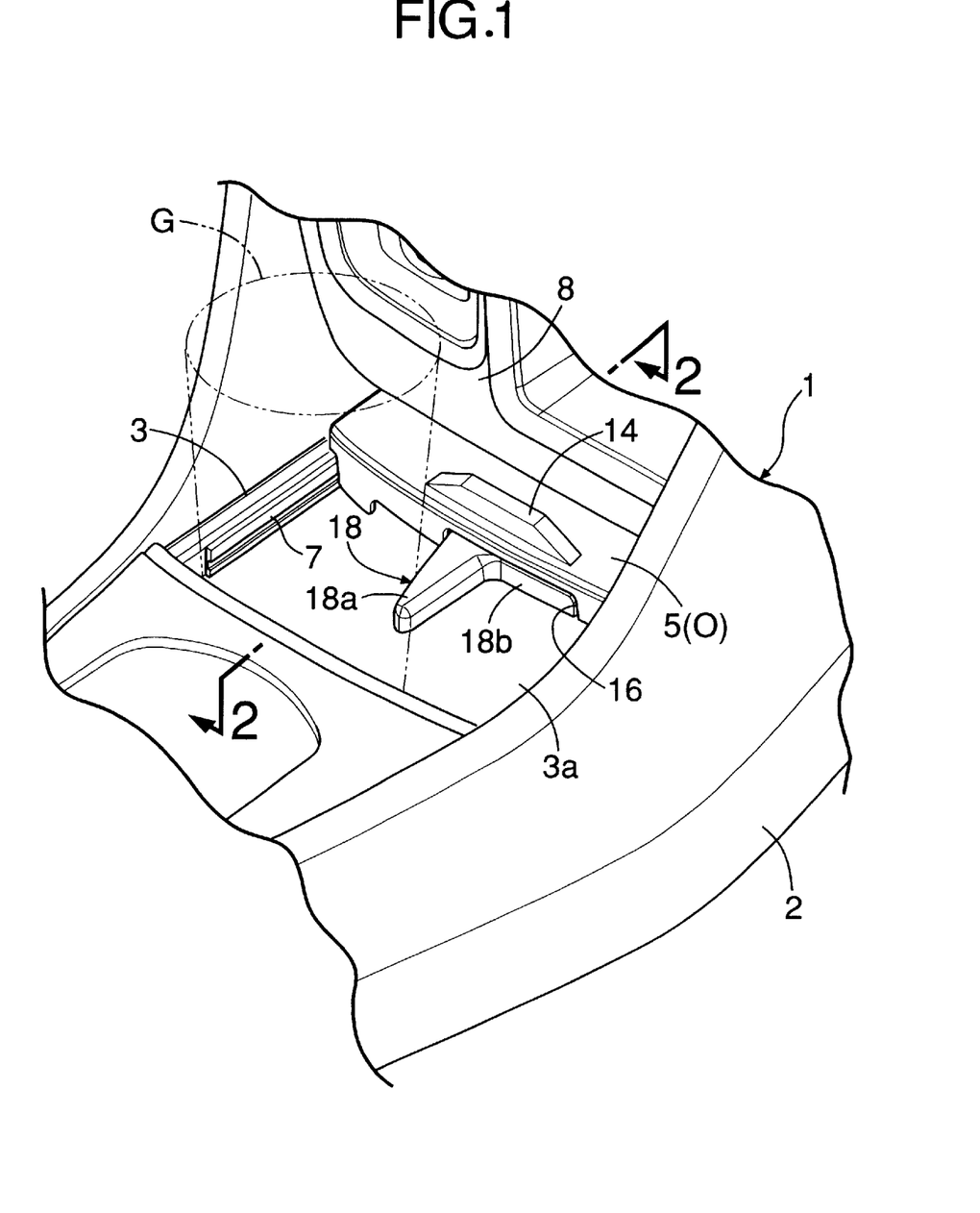
FIG. 1 is a perspective view showing a console for an automobile according to a first embodiment of the present invention in an operative state of a goods-supporting member.
Figure 2:
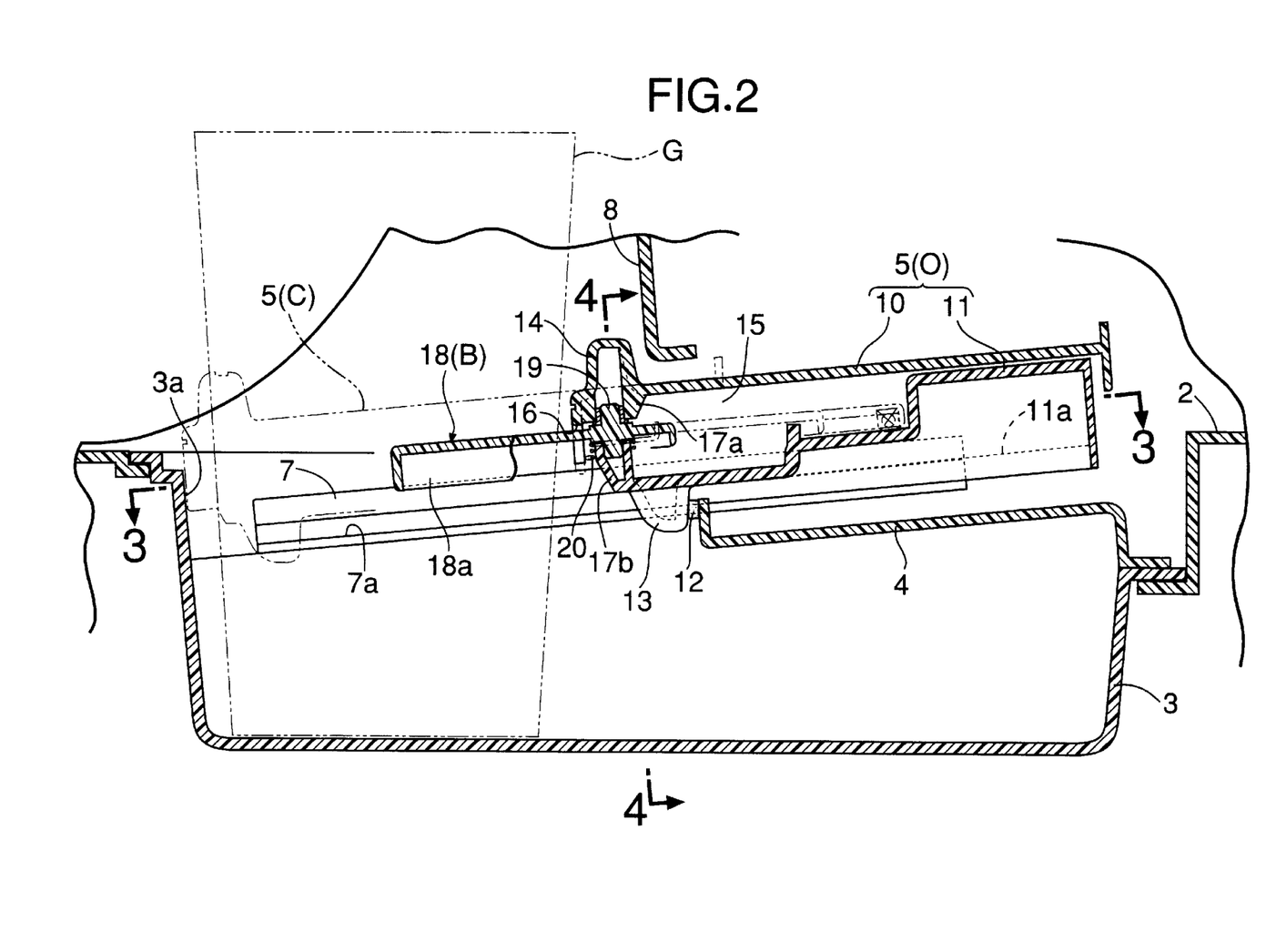
FIG. 2 is a sectional view taken along a line 2—2 in FIG. 1.

Referring to FIGS. 1 and 2, a console 1 for an automobile includes a console body 2 disposed between left and right seats within a vehicle compartment, and a tray 3 mounted at a horizontal portion of the console body 2. The tray 3 is of an oblong shape longer in a longitudinal direction, an upper surface of a front half of the tray 3 is closed by a fixed cover 4, and an opening 3a in an upper surface of a rear half of the tray 3 is opened and closed by a slidable lid 5. Namely, the lid 5 can be slid along rails 7, 7 formed on left and right sidewalls of the tray 3 between a closing position C in which the opening 3a in the tray 3 is closed and an opening position O in which the upper surface is opened.

An instrument panel 8 is connected to the console body 2 and rises from an intermediate portion of the tray 3, and the lid 5 slid to the opening position O is housed between the instrument panel 8 and the tray 3.

Figure 3:
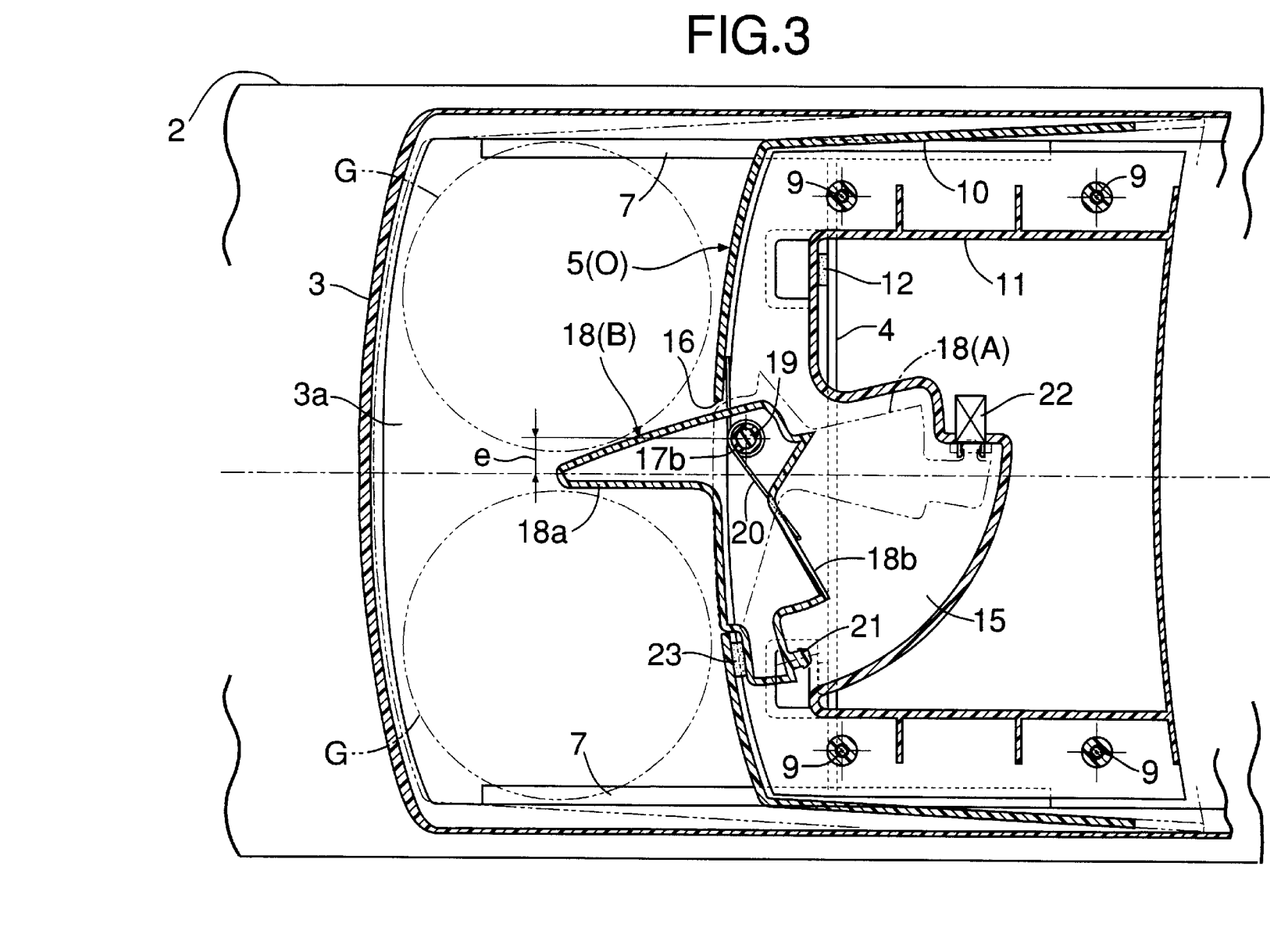
FIG. 3 is a sectional view taken along a line 3—3 in FIG. 2.
Figure 4:
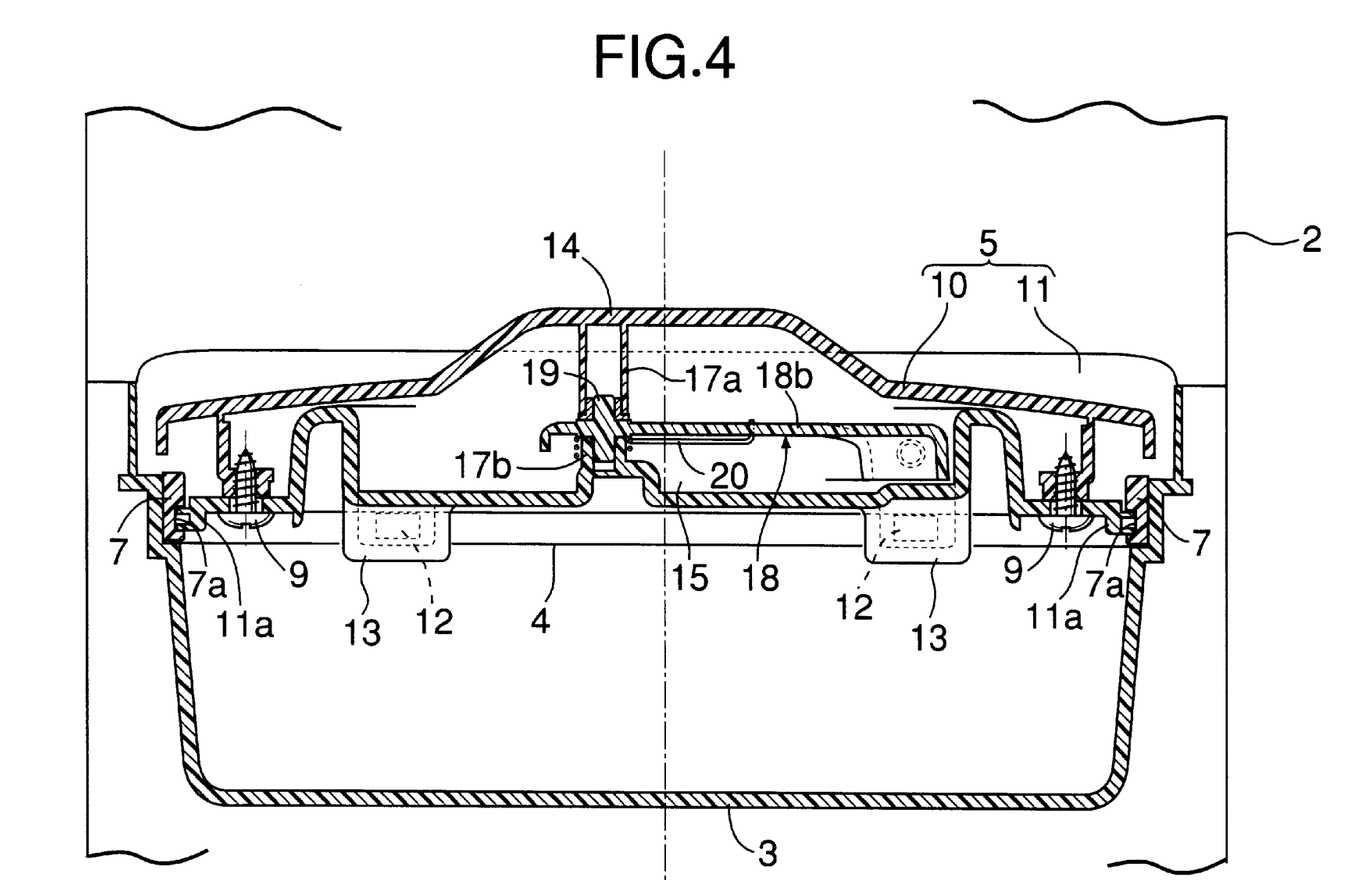
FIG. 4 is a sectional view taken along a line 4—4 in FIG. 2.

As shown in FIGS. 2 to 4, the lid 5 is comprised of an upper half 10 and a lower half 11 which are coupled to each other by a plurality of tapping screws 9. The lower half 11 is slidably engaged at its left and right ends in guide grooves 7a, 7a on the pair of rails 7, 7, and a pair of left and right stoppers 13, 13 are formed at a front end of the lower half 11 with cushion members 12 put into abutment against the stopper to define the opening position O of the lid 5. A knob 14 for opening and closing the rid 5 is projectingly provided on an upper surface of a rear end of the upper half 10.

A flat housing chamber 15 is defined between the upper and lower halves 10 and 11, and has an access port 16 provided in its rear end wall and adapted to open the chamber 15 toward the opening 3a in the tray 3. A pair of opposed bearing bosses 17a and 17b are provided in the vicinity of one side of the access port 16 to protrude from upper and lower walls of the housing chamber 15. A pivot 19 integrally formed on a base of an goods-supporting member 18 is rotatably supported by the bearing bosses 17a and 17b. The goods-supporting member 18 comprises first and second arms 18a and 18b integrally formed into an L-shape, and can be turned between a standby position A in which the access port 16 is closed by the first arm 18a and the second arm 18b is accommodated in a deeper portion of the housing chamber 18b, and an operative position B in which the first arm 18a protrudes toward the opening 3a in the tray 3 and the access port 16 is closed by the second arm 18b. An operating spring 20 comprising a torsion coil spring for biasing the goods-supporting member 18 toward the operative position B is mounted on the bearing boss 17b. The standby position A of the goods-supporting member 18 is defined by the engagement of an engagement element 21 at a tip end of the second arm 18b with a latch mounted on a front wall of the housing chamber 15, and the operative position B is defined by the abutment of the tip end of the second arm 18b against a rear end wall of the housing chamber 15 with the cushion member 23 interposed therebetween.

The goods-supporting member 18 is formed so that when it occupies the operative position B, the tip end of the first arm 18a is offset by a given distance $\underline{e}$ (see FIG. 3) from the pivot 19 toward the second arm 18b in a lateral direction. When the tip end of the first arm 18a is put into abutment against an inner wall of a rear portion of the tray 3 in a course of closing the lid 5, a moment in a direction toward the standby position A is applied from the inner wall of the rear portion of the tray 3 to the first arm 18a.

The latch 22 is of a known type capable of repeatedly locking and releasing the locking of the engagement element 21, whenever the engagement element 21 is pushed into the latch 22.

The operation of the first embodiment will be described below.

Figure 5:
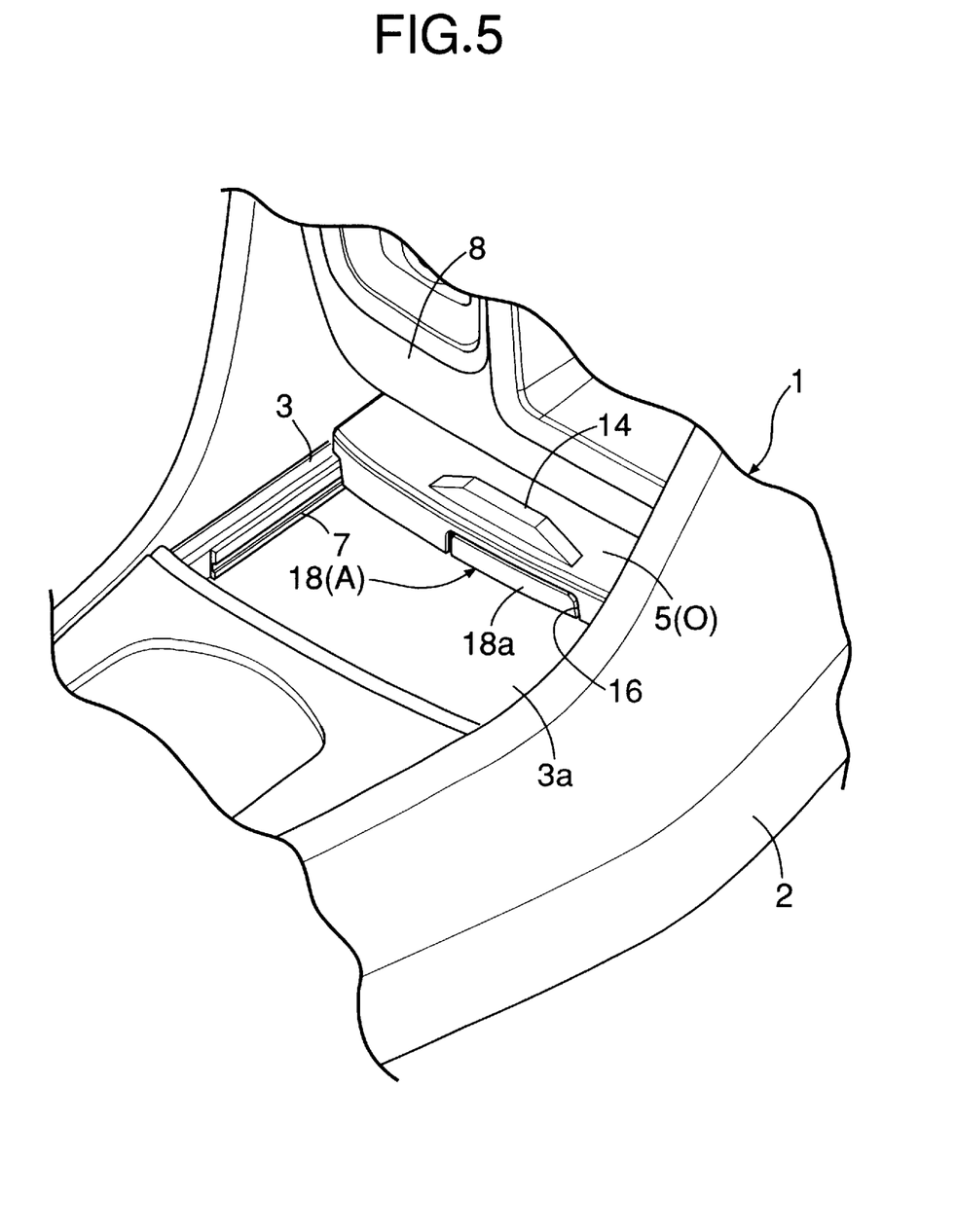
FIG. 5 is a view similar to FIG. 1, but showing an opened state of a lid.

As shown in FIG. 5, if the first arm 18a of the goods-supporting member 18 is pushed once toward the housing chamber 15, i.e., forwards by a fingertip when the lid 5 is in its opened state and the goods-supporting member 18 is in the standby position A, the locking of the engagement element 21 by the latch 22 is released. Thus, the goods-supporting member 18 is turned to the operative position B by a biasing force of the operating spring 20, so that the first arm 18a protrudes toward the opening 3a in the tray 3, as shown in FIG. 1. Therefore, in this state, if goods G such as a drink cup and a drink can are put in an upright attitude within the tray, the goods G are supported by the first arm 18a, the left and right sidewalls and rear wall of the tray 3 and the rear end of the lid 5, whereby the falling-down of the goods G can be prevented. Of course, the preset load of the operating spring 20 is set at a value enough to inhibit the falling-down of the goods G. At this time, the second arm 18b is in abutment against the rear end wall of the housing chamber 15 to define the operative position B of the goods-supporting member 18, but also serves to close the access port 16 in the rear end wall, to thereby improve the appearance.

If the first arm 18a in the protruding state is then turned toward and pushed into the access port 16 in the lid 5 against the biasing force of the operating spring 20, the engagement element 21 of the second arm 18b is engaged with the latch 22, whereby the goods-supporting member 18 is retained at the standby position A in which it has been housed in the housing chamber 15. Therefore, the inside of the tray 3 can be used widely as a usual goods receptacle, as shown in FIG. 5. At this time, the first arm 18a serves to close the access port 16 in the rear end wall of the lid 5, whereby a good appearance can be ensured.

Figure 6:
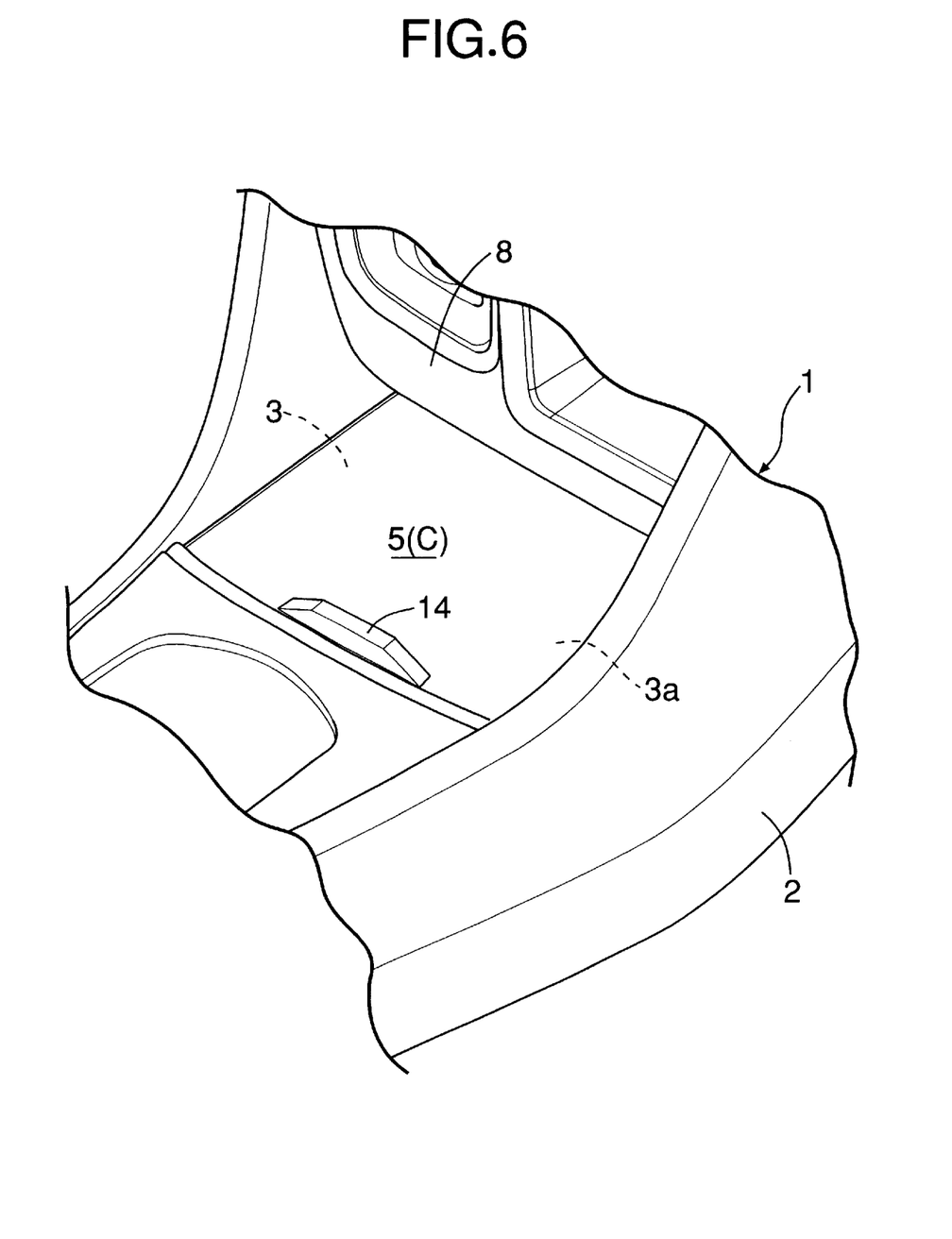
FIG. 6 is a view similar to FIG. 1, but showing a closed state of the lid.

If the tray 3 is pulled rearwards with a finger put on the knob 14, the opening 3a in the tray 3 can be closed by the lid 5 without being interfered by the goods-supporting member 18, as shown in FIG. 6.

Even if the lid 5 is closed with the goods-supporting member 18 remaining at the operative position B, the moment in a direction toward the standby position A is applied to the first arm 18a as described above by the abutment of the tip end of the first arm 18a against the inner wall of the rear portion of the tray 3 in a course of the closing of the lid 5. Therefore, the goods-supporting member 18 can be automatically turned to the standby position A by a force of closing the lid 5.

A second embodiment of the present invention will now be described with reference to FIGS. 7 to 10.

In the second embodiment, a goods-supporting member 38 is constructed into a sliding type. More specifically, guide bores 25 and 26 are provided in central portions of rear end walls of an upper lid half 10 and a lower lid half 11, which are opposed to each other at a given distance, so that the rod-shaped goods-supporting member 38 is supported by the guide bores 25 and 26 for sliding movement in a longitudinal direction. Thus, the goods-supporting member 38 can be moved between a standby position A in which it is housed in the lid 5, and an operative position B in which it protrudes toward the opening 3a in the tray 3. The operative position B of the goods-supporting member 38 is defined by the abutment of a flange 38a formed at a rear end of the goods-supporting member 38 against the rear end wall of the upper lid half 10, and the standby position A is defined by the locking of an engagement element 31 formed on the flange 38a to a latch 32 mounted to a partition wall 27 within the lower lid half 11. A coil-shaped operating spring 30 for biasing the goods-supporting member 38 toward the operative position B is mounted under compression between the partition wall 27 and the goods-supporting member 38. The arrangement of the other components is the same as those in the previous embodiment, and hence portions or components corresponding to those in the previous embodiment are designated by the same reference numerals and symbols in FIGS. 7 to 10, and the description of them is omitted.

Figure 7:
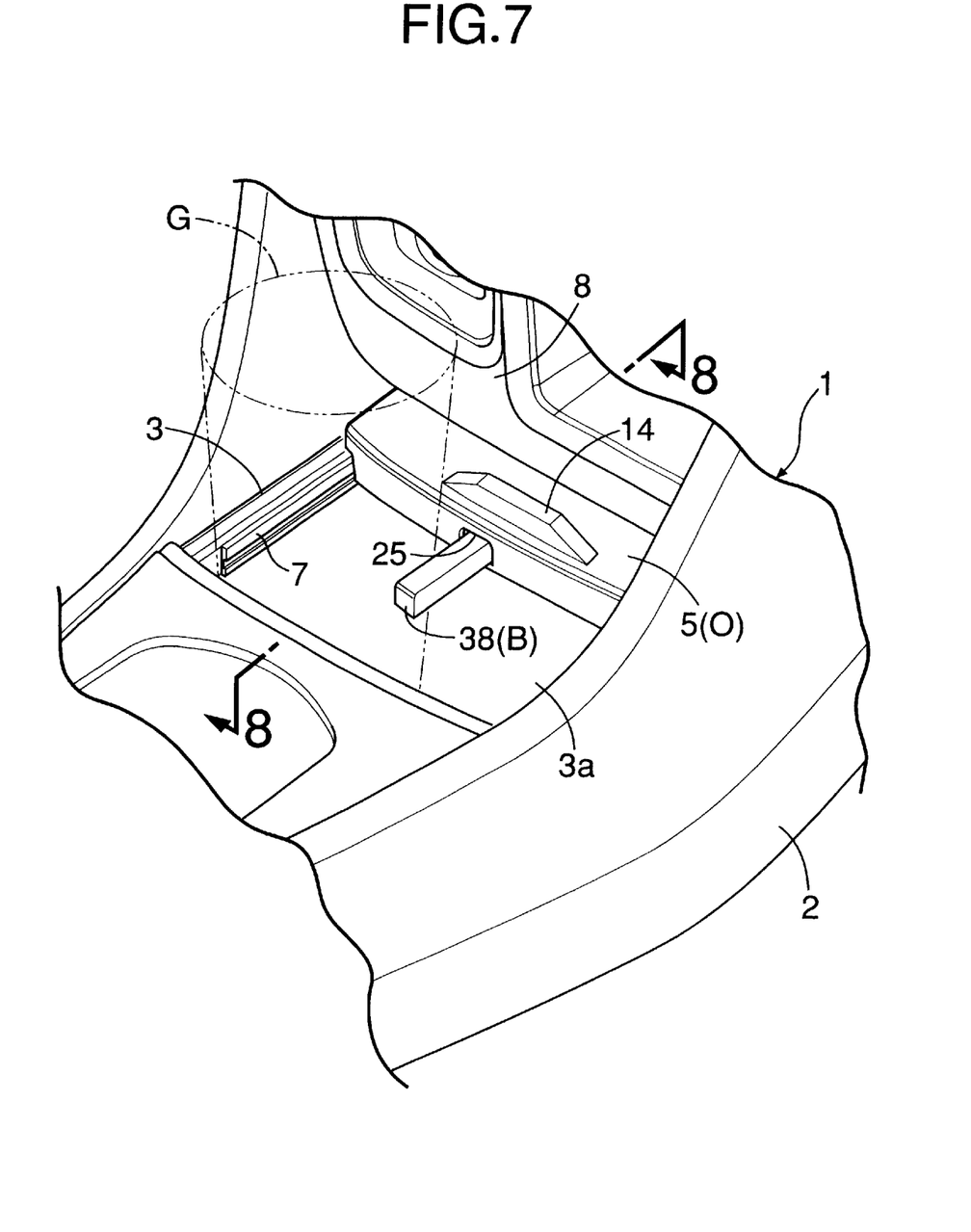
FIG. 7 is a perspective view of a console for an automobile according to a second embodiment of the present invention.
Figure 8:
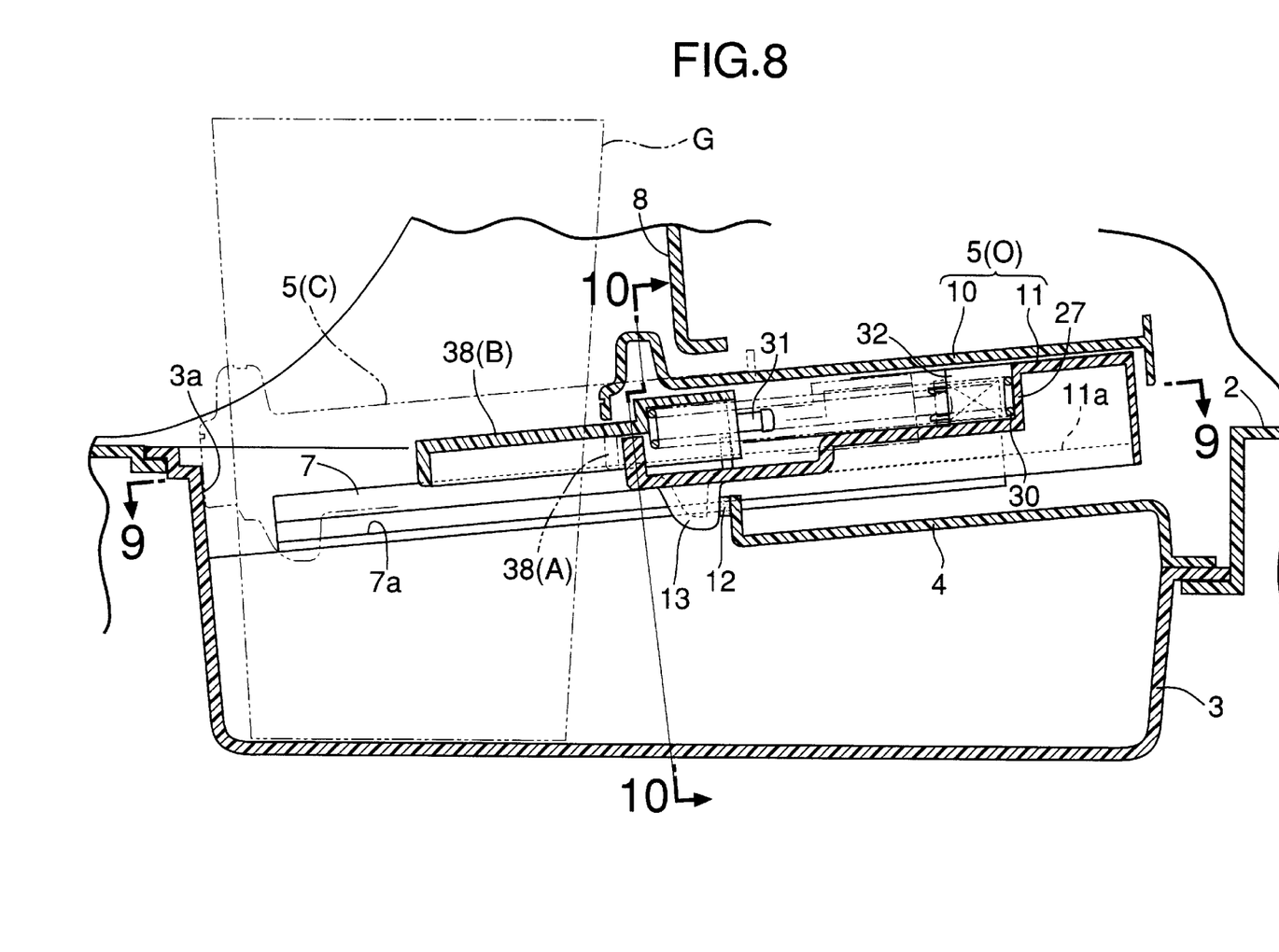
FIG. 8 is a sectional view taken along a line 8—8 in FIG. 7.
Figure 9:
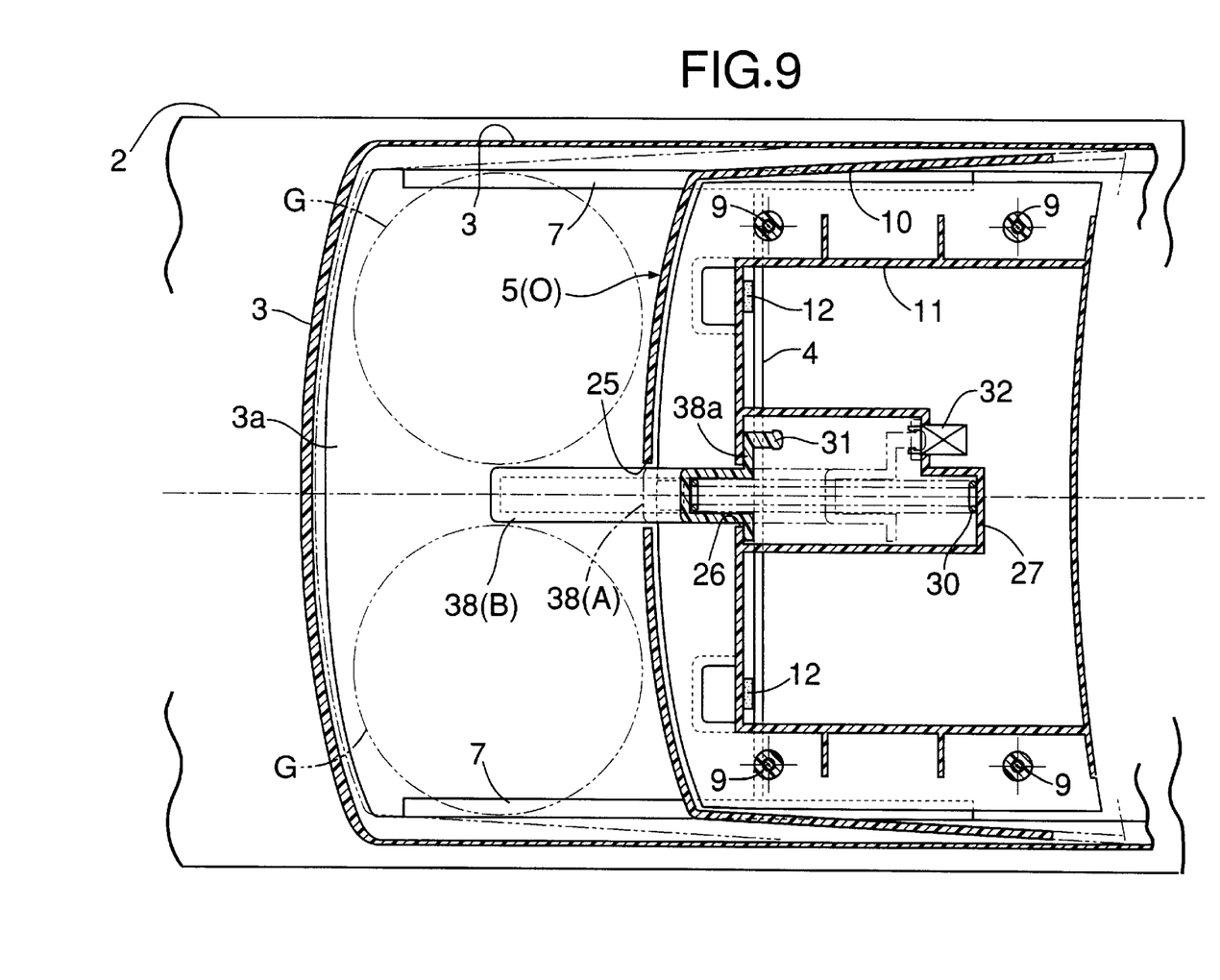
FIG. 9 is a sectional view taken along a line 9—9 in FIG. 8.
Figure 10:
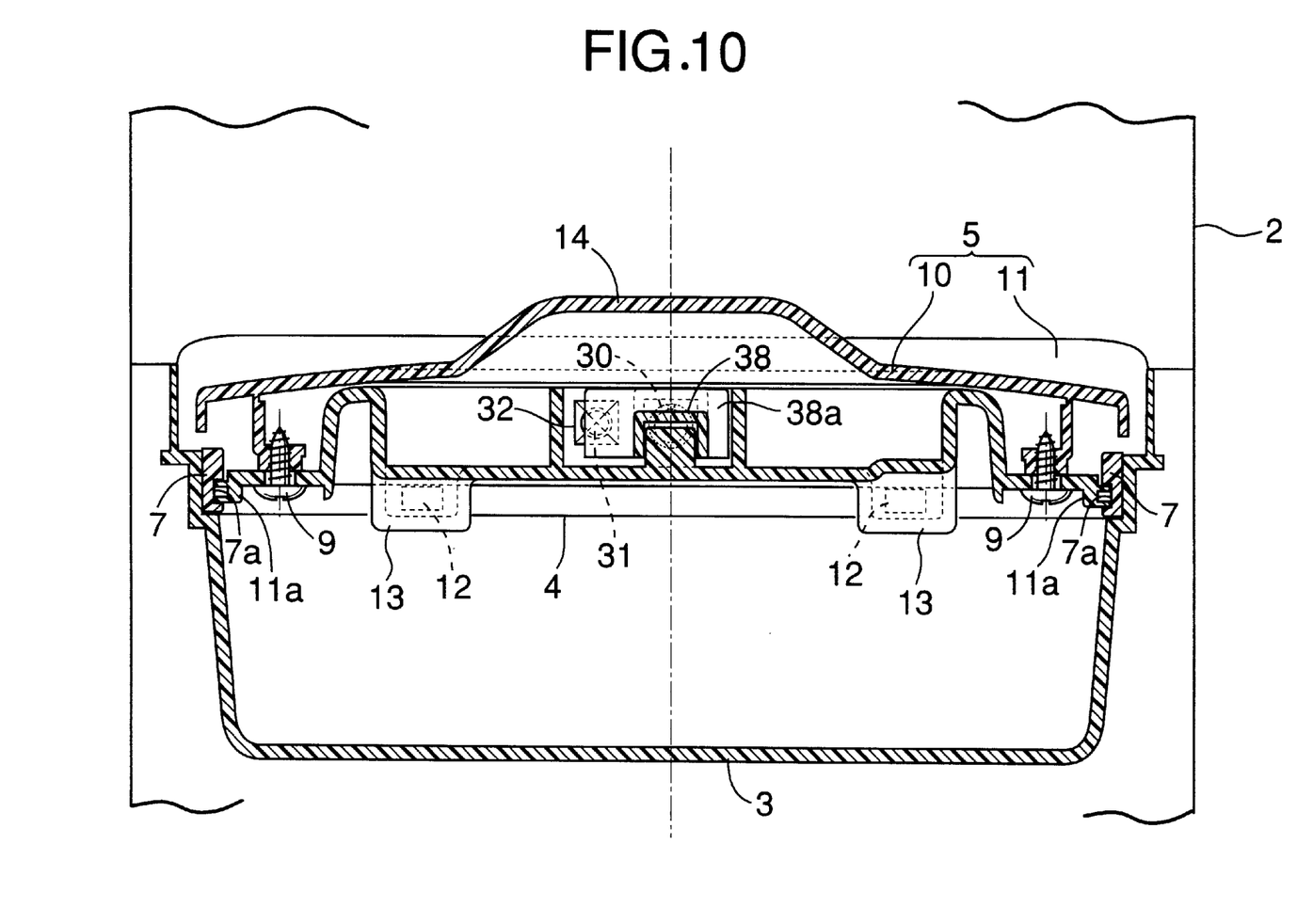
FIG. 10 is a sectional view taken along a line 10—10 in FIG. 8.

If the rear end of the goods-supporting member 38 is pushed once into the lid 5 by a fingertip when the lid 5 is in its opened state and the goods-supporting member 38 is in the standby position A, the locking of the engagement element 31 to the latch 32 is released. Therefore, the goods-supporting member 38 is operated to protrude toward the operative position B, i.e., toward the opening 3a in the tray 3 by a biasing force of the operating spring 30, whereby the falling-down of the goods G put in an upright attitude within the tray 3 can be prevented, as in the previous embodiment.

If the goods-supporting member 38 in the protruding state is pushed into the lid 5 against the biasing force of the operating spring 30, the engagement element 31 is locked to the latch 32, whereby the goods-supporting member 38 is retained in the standby position A. Also in this case, the inside of the tray 3 can be used widely as a usual goods receptacle. If the tray 3 is pulled rearwards by a finger put on the knob 14 of the lid 5, the opening 3a in the tray 3 can be closed by the lid 5 without being interfered by the goods-supporting member 18.

In either of the first and second embodiments, the lid 5 is utilized for mounting the goods-supporting member 18, 38, and hence it is unnecessary to prepare a space for mounting the goods-supporting member 38 in the tray 3 or the console body 2, whereby a decrease in internal volume of the tray 3 and an increase in size of the console body 2 can be avoided.

The present invention is not limited to the above-described embodiments, and various modifications in design may be made without departing from the spirit and scope of the invention defined in the claims.

What is claimed is:

1. A console for a vehicle, comprising a lid which is mounted on a console body having a tray and which slidably moves between a closing position in which an opening in an upper surface of the tray is closed, and an opening position in which said opening is opened, wherein said lid is provided with a goods-supporting member which is capable of being selectively moved between an operative position in which it protrudes toward said opening in said tray to prevent the falling-down of goods put in an upright attitude in said tray, and a standby position in which it is housed in said lid, when said lid is in its opened position.

2. A console for a vehicle according to claim 1, wherein said lid has a housing chamber in which said goods-supporting member in the standby position is housed, and an access port through which said goods-supporting member is moved from and into said housing chamber into and from said tray, and said goods-supporting member is disposed so that when said goods-supporting member occupies the standby position, it closes said access port.

3. A console for a vehicle according to claim 2, wherein said goods-supporting member is provided with first and second arms disposed in an L-shape, and is pivotally supported on the lid so that it can be turned between the standby position in which said access port is closed by said first arm and said second arm is housed in a deeper portion of said housing chamber, and the operative position in which said first arm protrudes toward said opening in said tray and said access port is closed by said second arm.

4. A console for a vehicle according to claim 1 or 2, wherein an operating spring for biasing said goods-supporting member toward the operative position is connected to said goods-supporting member, and a locking means capable of locking and releasing said goods-supporting member in the standby position is mounted between said goods-supporting member and said lid.

5. A console for a vehicle according to claim 3, wherein an operating spring for biasing said goods-supporting member toward the operative position is connected to said goods-supporting member, and a locking means capable of locking and releasing said second arm in the standby position of said goods-supporting member is mounted between said second arm and said lid.

6. A console for a vehicle according to claim 5, wherein said goods-supporting member is designed so that when a tip end of said first arm abuts against an inner wall of the tray in a course of closing of said lid when said goods-supporting member is in the operative position, said goods-supporting member is turned toward the standby position by the resulting reaction force.

7. A console for a vehicle according to claim 1, wherein said goods-supporting member is formed into a rod-shape and slidably supported on said lid so that it can be moved between the standby position in which it is housed in said lid, and the operative position in which it protrudes toward said opening in said tray; an operating spring for biasing said goods-supporting member toward the operative position is connected to said goods-supporting member; and a locking means capable of locking and releasing said goods-supporting member in the standby position is mounted between said goods-supporting member and said lid.

* * * * *